(12) United States Patent
Hicks

(10) Patent No.: US 9,180,565 B2
(45) Date of Patent: Nov. 10, 2015

(54) DECORATIVE TRIM ASSEMBLY FIXTURE AND METHOD OF USING SAME

(75) Inventor: Thomas S. Hicks, Allen, MI (US)

(73) Assignee: Pilkington Group Limited, St. Helens (GB)

( * ) Notice: Subject to any disclaimer, the term of this patent is extended or adjusted under 35 U.S.C. 154(b) by 883 days.

(21) Appl. No.: 13/396,948

(22) Filed: Feb. 15, 2012

(65) Prior Publication Data

US 2012/0242023 A1     Sep. 27, 2012

Related U.S. Application Data

(60) Provisional application No. 61/467,007, filed on Mar. 24, 2011.

(51) Int. Cl.
| | |
|---|---|
| *B25B 1/20* | (2006.01) |
| *B23P 19/04* | (2006.01) |
| *B60R 13/04* | (2006.01) |

(52) U.S. Cl.
CPC .............. *B23P 19/047* (2013.01); *B60R 13/04* (2013.01); *Y10T 29/49998* (2015.01)

(58) Field of Classification Search
USPC .......................................................... 269/37
See application file for complete search history.

(56) References Cited

U.S. PATENT DOCUMENTS

| | | | | | |
|---|---|---|---|---|---|
| 3,338,007 | A | * | 8/1967 | Draplin ............................. | 52/208 |
| 4,904,014 | A | * | 2/1990 | Azarovitz et al. ........ | 296/146.15 |
| 5,353,571 | A | * | 10/1994 | Berdan et al. ................ | 52/716.5 |
| 5,624,148 | A | * | 4/1997 | Young et al. ..................... | 296/93 |
| 5,694,718 | A | * | 12/1997 | Norton ............................. | 49/440 |
| 6,467,232 | B1 | | 10/2002 | Mackey | |
| 6,546,683 | B1 | * | 4/2003 | Senge ............................... | 52/208 |
| 7,600,806 | B2 | * | 10/2009 | Arai et al. ................. | 296/146.15 |
| 7,748,433 | B2 | * | 7/2010 | Huang ..................... | 160/370.21 |
| 7,845,143 | B2 | * | 12/2010 | Katakura et al. ........... | 52/787.12 |
| 7,918,058 | B2 | * | 4/2011 | Debailleul et al. .......... | 52/204.53 |
| 8,434,267 | B2 | * | 5/2013 | Bocutto ........................ | 49/479.1 |
| 8,829,539 | B2 | * | 9/2014 | Kleo et al. ....................... | 257/82 |
| 8,904,735 | B2 | * | 12/2014 | Grandgirard et al. ...... | 52/745.15 |
| 2003/0075949 | A1 | * | 4/2003 | Kanie et al. .............. | 296/146.15 |
| 2003/0200718 | A1 | * | 10/2003 | Ito ................................ | 52/716.5 |
| 2004/0016099 | A1 | | 1/2004 | Hicks et al. | |
| 2004/0209087 | A1 | | 10/2004 | Ash et al. | |
| 2008/0238130 | A1 | * | 10/2008 | Simmons et al. ............... | 296/79 |
| 2010/0326983 | A1 | | 12/2010 | Sitterlet | |
| 2011/0138716 | A1 | * | 6/2011 | Schulte et al. .................. | 52/208 |

FOREIGN PATENT DOCUMENTS

| | | |
|---|---|---|
| JP | 2000079626 | 3/2000 |
| JP | 2005104331 | 4/2005 |
| WO | WO 2009/068624 | 6/2009 |

* cited by examiner

*Primary Examiner* — Lee D Wilson
*Assistant Examiner* — Alvin Grant
(74) *Attorney, Agent, or Firm* — Marshall & Melhorn, LLC

(57) ABSTRACT

An assembly fixture allows for the incorporation of a decorative trim piece into an encapsulated window assembly. A method of utilizing the assembly fixture to incorporate the decorative trim piece into the vehicle window assembly is also provided.

7 Claims, 12 Drawing Sheets

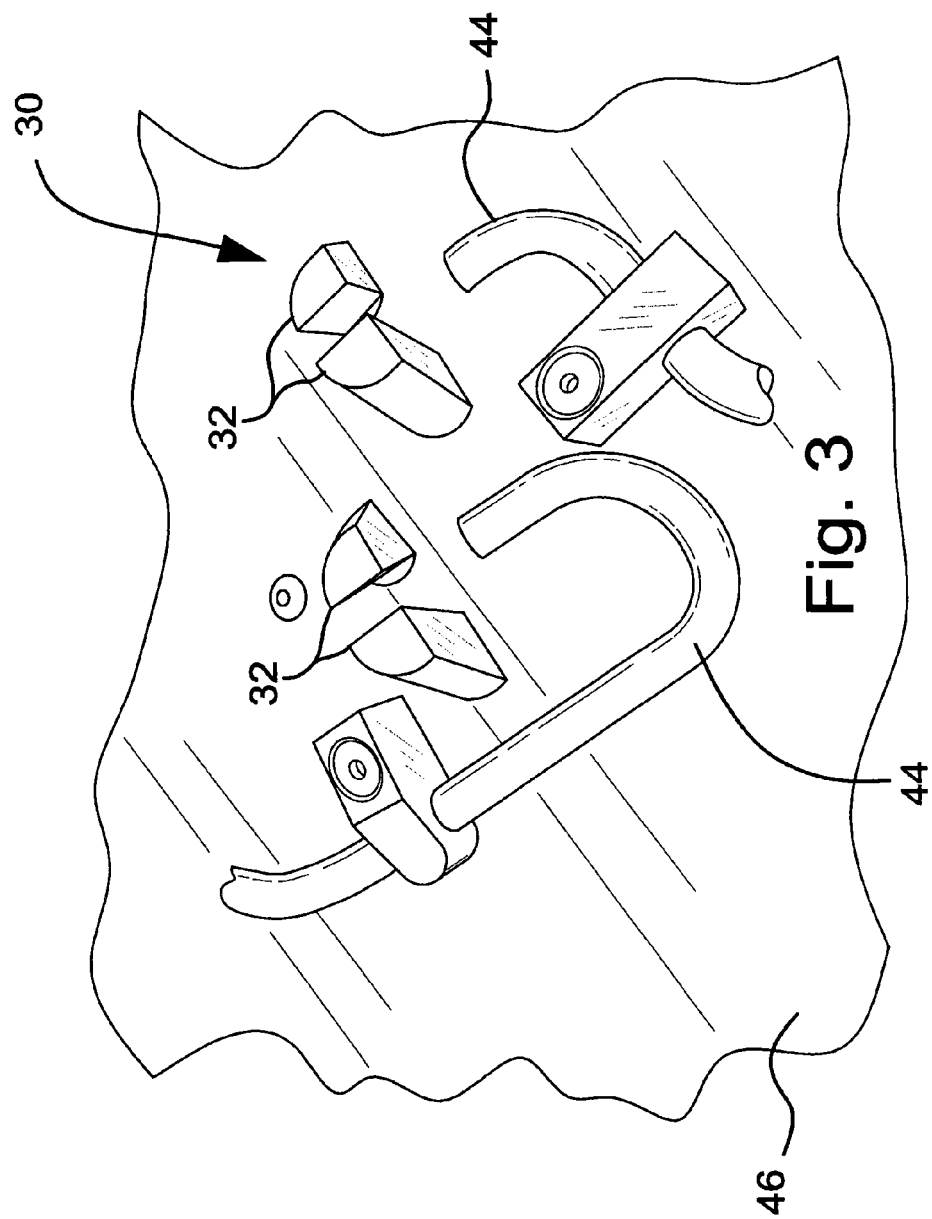

DECORATIVE TRIM ASSEMBLY FIXTURE AND METHOD OF USING SAME

RELATED APPLICATION

This application is claiming the benefit, under 35 U.S.C. 119(e) of the provisional application filed Mar. 24, 2011 under 35 U.S.C. 111(b), which was granted Ser. No. 61/467,007. This provisional application is hereby incorporated herein by reference, in its entirety.

BACKGROUND OF THE INVENTION

The present invention relates to a vehicle window assembly fixture. More particularly, the present invention relates to an assembly fixture for incorporating a decorative trim piece as a component of an encapsulated vehicle window assembly and a method of utilizing the fixture.

Various methods of incorporating decorative trim pieces into vehicle window assemblies have been utilized. Such methods have attempted to solve common problems of handling decorative trim pieces which are relatively easily damaged. For example, some decorative metal trim pieces may have highly polished outer or "show" surfaces which are relatively easily scuffed or scratched. It has also proven difficult to incorporate decorative trim members into vehicle window assemblies so that they remain securely affixed over a long period of time. Some methods to address the foregoing, problems are very labor intensive, and thus, add significant cost to the production of the window assembly.

Accordingly, it would be advantageous to have a relatively automated method of incorporating a decorative trim piece into a vehicle window assembly in a reliable, cost-effective manner.

SUMMARY OF THE INVENTION

The present invention relates to a vehicle window assembly fixture. More specifically, the present invention relates to an assembly fixture for incorporating a decorative trim piece as a component of an encapsulated vehicle window assembly. A method of utilizing the fixture is also a part of the invention.

The assembly fixture of the invention performs a number of assembly operations to incorporate at least one decorative trim piece into a vehicle window assembly, which includes a vehicle window having an elastomeric member, such as a frame or gasket, around at least a portion of the periphery thereof. The vehicle window assembly in this unfinished form is placed on one or more supporting members of the fixture, and is positioned so that portions of the window assembly upon which assembly operations are to be performed are proximate those components of the fixture which perform the desired operations. A decorative trim piece is then positioned on the encapsulated vehicle window assembly previously disposed on the assembly fixture. Assembly operations may include, although different assembly operations are possible: Securing the encapsulated vehicle window assembly in place on the fixture, preferably by vacuum means, pressing the decorative trim piece against the elastomeric member so that attachment tabs which are part of the trim piece extend through slots in the elastomeric member from the underside of the encapsulated window assembly, crimping the attachment tabs so that they lock the trim piece into the elastomeric member, trimming excess encapsulation materials off the underside of the window assembly at one or more locations where the encapsulation material was injected during the process of molding the elastomeric member, and removing the finished encapsulated window assembly with incorporated decorative trim piece from the fixture for ultimate installation in a vehicle body opening.

Components of the assembly fixture which perform the possible assembly operations noted above include: at least one positioning block, at least one resilient vertical support member, at least one trim piece tab crimping vice, at least one encapsulation material trimming device and at least one trim piece setting device. These components will be described in greater detail in subsequent portions of this application.

BRIEF DESCRIPTION OF THE DRAWINGS

The above as well as other advantages of the present invention will become readily apparent to those skilled in the art from the following detailed description when considered in the light of the accompanying drawings in which:

FIG. 3 shows a perspective view of the encapsulation material trimming device according to the invention.

DETAILED DESCRIPTION OF THE INVENTION

The present invention relates to a vehicle window assembly fixture 10. More specifically, the present invention relates to an assembly fixture 10 for incorporating a decorative trim piece 12 as a component of an encapsulated vehicle window assembly 14, as well as a method of utilizing the assembly fixture 10 to produce a finished part.

The assembly fixture 10 of the invention has been found to be advantageous in repeatably and securely incorporating a decorative trim piece 12 into an encapsulated vehicle window assembly 14 in a significantly shorter time than can be achieved by, for example, manual assembly methods. Time and labor savings result in substantial reduction in production cost of the vehicle window assembly 14 with decorative trim piece 12 incorporated therein. Use of the assembly fixture 10 of the invention has also been shown to cause minimal damage to the decorative trim piece 12 compared to other methods, thus reducing re-work and scrap rates. Such reductions create additional cost savings.

Figure 1:
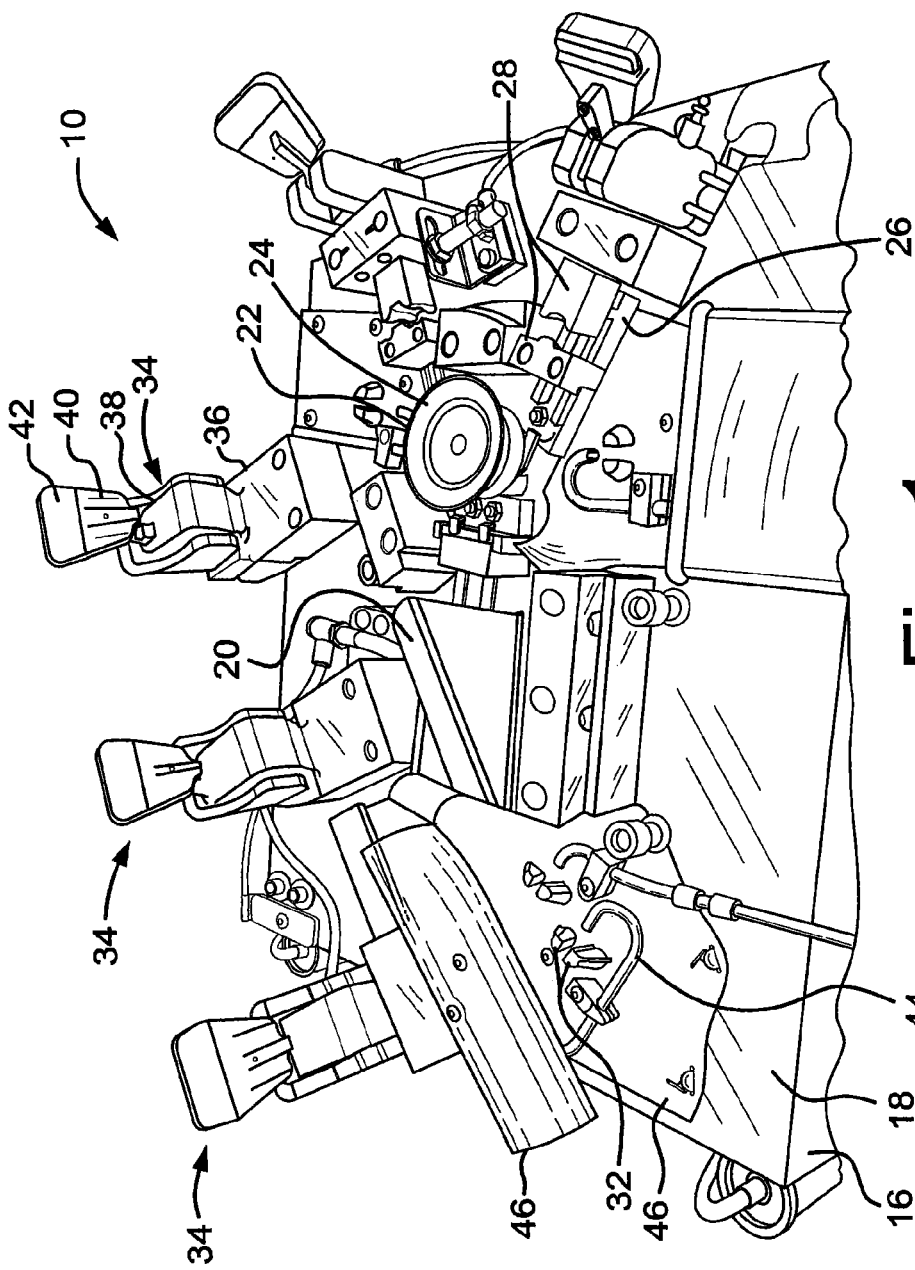
FIG. 1 shows a perspective view of the encapsulated vehicle window assembly fixture according to the invention.

FIG. 1 shows substantially the entire assembly fixture 10 according to the invention. Not shown are system control devices, sources of positive and negative gaseous pressure, sources of hydraulic pressure and/or electrical power and the like, as these functions can be accomplished by any suitable, conventional means.

Figure 2A:
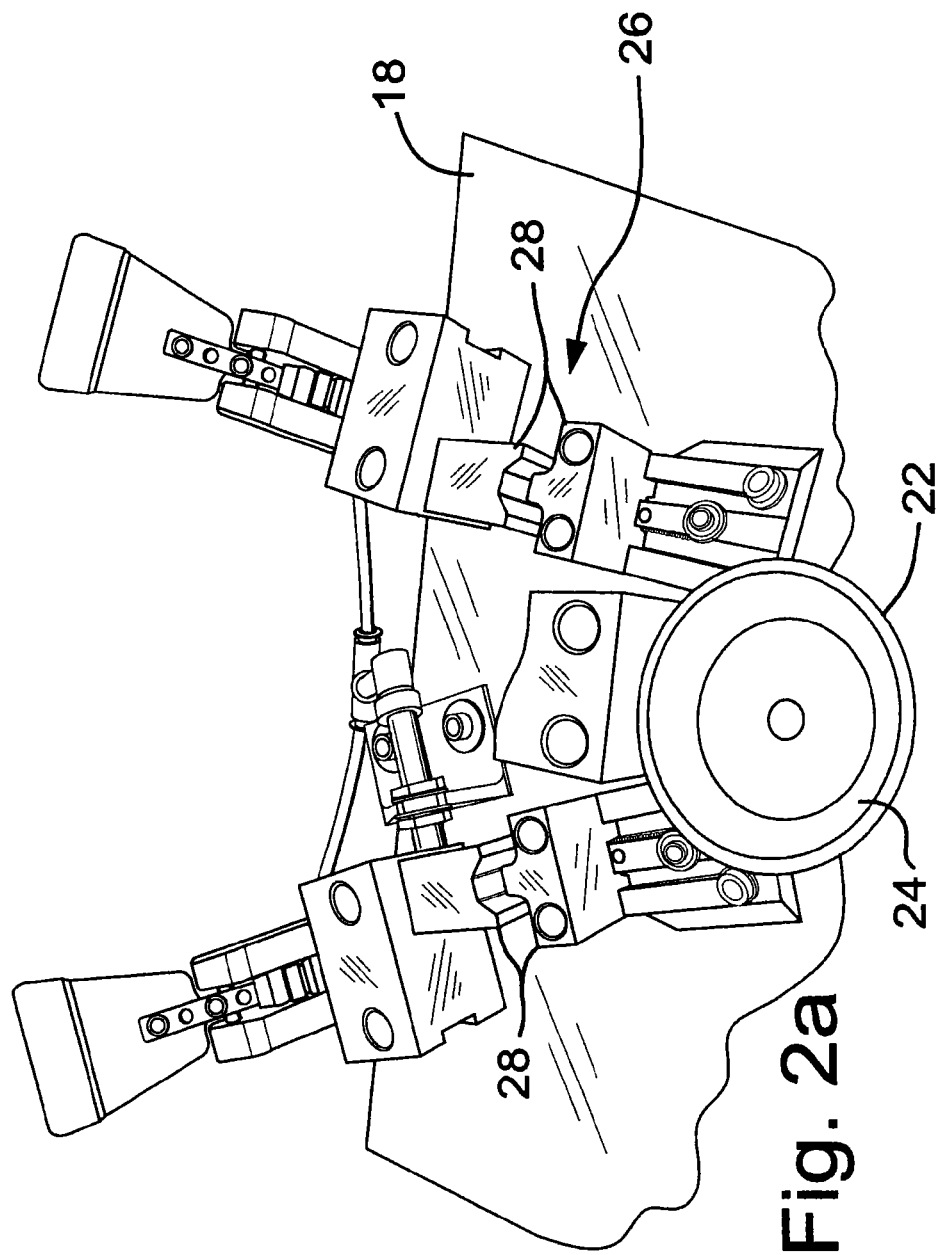
FIGS. 2a and 2b show perspective views of the trim piece attachment crimping vice according to the invention.
Figure 2B:
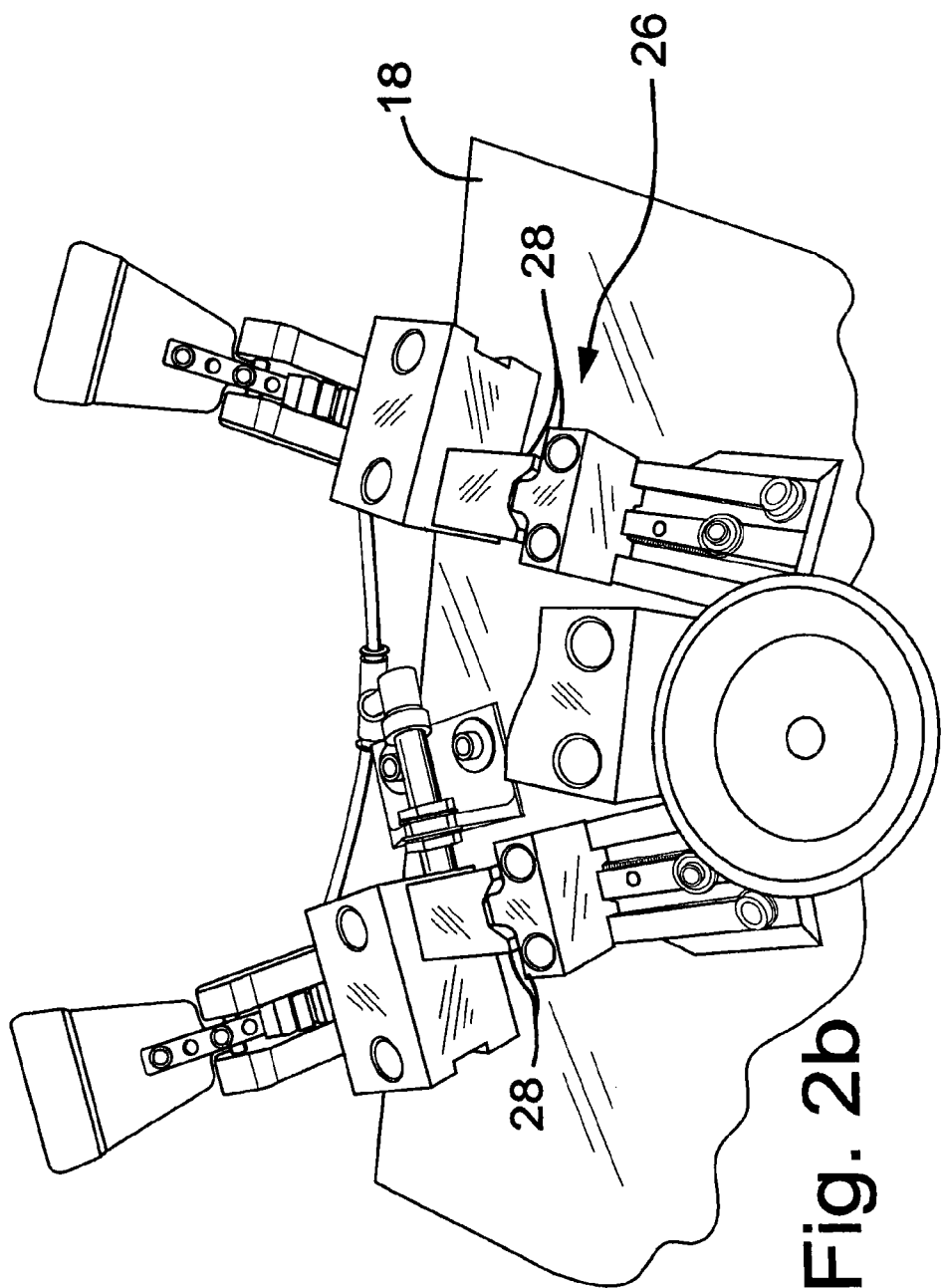
Figure 4:
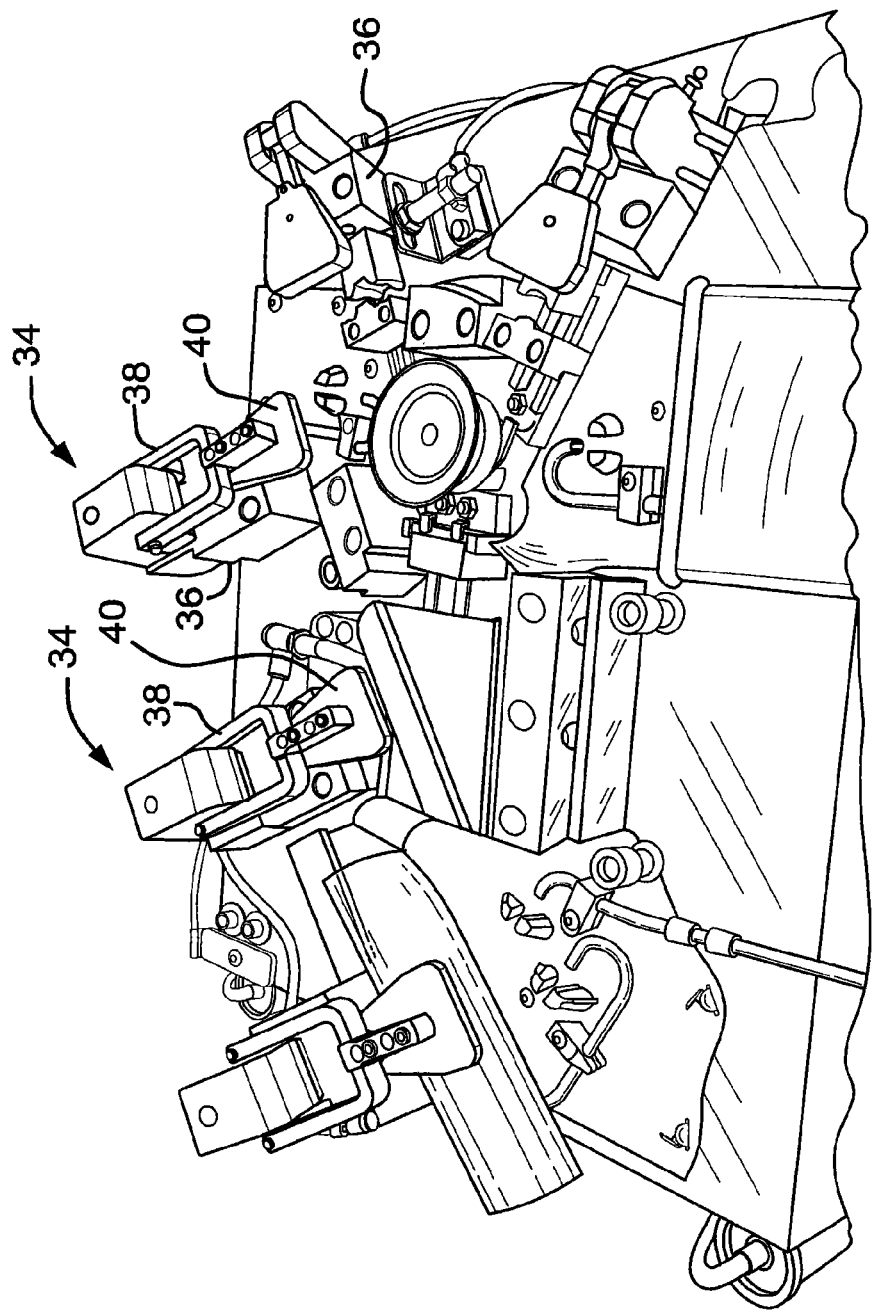
FIG. 4 shows a perspective view of the trim piece setting device according to the invention.

The assembly fixture of the invention, preferably includes a substantially flat base member 16 having at least one major surface 18 of any suitable geometric shape, and made from any suitable material, but preferably from metal, for example, aluminum or steel affixed in predetermined positions on the base member 16, and positioned so as to be operably proximate predetermined portions of an encapsulated vehicle window assembly 14 placed on the assembly fixture 10 are:

- at least one positioning block 20 having any suitable geometric shape and made from any suitable material, but preferably from metal, for example, aluminum or steel;
- at least one vertical support member 22 having a resilient contact portion 24, for example, a suction cup-like structure through which a negative gaseous pressure is preferably transmitted;
- at least one trim piece tab crimping vice 26, having a pair of jaws 28, preferably, made from a hard metal such as steel, at least one jaw being movable along a prescribed path in an orientation generally parallel to the base member 16, which movable jaw is driven along such path by a suitable method, so as to be capable of exerting a sufficient crimping force (see FIG. 2);
- at least one encapsulation material trimming device 30 having one or more trimming blades 32 made from any material suitable for removing excess elastomeric material in a clean and complete manner, preferably a metal, such as steel (see FIG. 3);
- at least one trim piece setting device 34 having a base 36 upon which is mounted a movable swing-arm type mechanism 38 to which swing-arm mechanism 38 is mounted a trim piece setting paddle 40, the above-noted components preferably made from a suitable metal, except for the portion of the setting paddle 40 which pressingly engages with the decorative trim piece 12, this engaging portion 42 being made from a soft material which will not cause damage to the surface of the decorative trim piece 12 (see FIG. 4).

The assembly fixture 10 of the invention is controlled by one or more control devices of any suitable type, but preferably electronic controllers. The various components just described are actuated by one or more of electrical, hydraulic, and pneumatic systems, or combinations thereof.

It has been found to be advantageous to include one or more air cleaning devices 44 located proximate the at least one encapsulation material trimming device 30. Such air cleaning devices 44 preferably utilize compressed air to remove the elastomeric material trimmed from the vehicle window assembly 14 from the vicinity of the one or more trimming blades 32 of the encapsulation material trimming device 30 to ensure the trimming blades 32 are clean each time they are actuated, and therefore, function effectively (see FIGS. 1 and 3).

To ensure that the elastomeric material blown by the air cleaning device 44 does not lodge in undesired areas of the assembly fixture 10 causing equipment malfunctions or product defects, it has been found to be desirable to dispose one or more protective coverings 46, preferably made of a flexible plastic material, in the vicinity of the air cleaning system 44. It will be noted that the one or more trimming blades 32 should be allowed to protrude through any protective covering 46 in the immediate vicinity of the trimming blades 32, so as to allow for their operation (see FIGS. 1 and 3).

A representative method of assembling an encapsulated vehicle window assembly 14 including a decorative trim piece 12 utilizing the assembly fixture 10 of the invention will now be described, although other methods of operating the fixture 10 may be possible within the scope of the invention.

An assembly fixture 10 is provided, the assembly fixture 10 comprising:

- a base member 16, preferably being substantially flat although other shapes may also be suitable, having affixed to major surface 18 thereof in predetermined positions thereon;
- at least one positioning block 20;
- at least one resilient vertical support member 22 connected to a source of negative gaseous pressure;
- at least one trim piece tab crimping vice 26 having a pair of jaws 28, at least one of which is movable;
- at least one encapsulation material trimming device 30 having one or more trimming blades 32; and
- at least one trim piece setting device 34 having a movable setting paddle 40.

Figure 5:
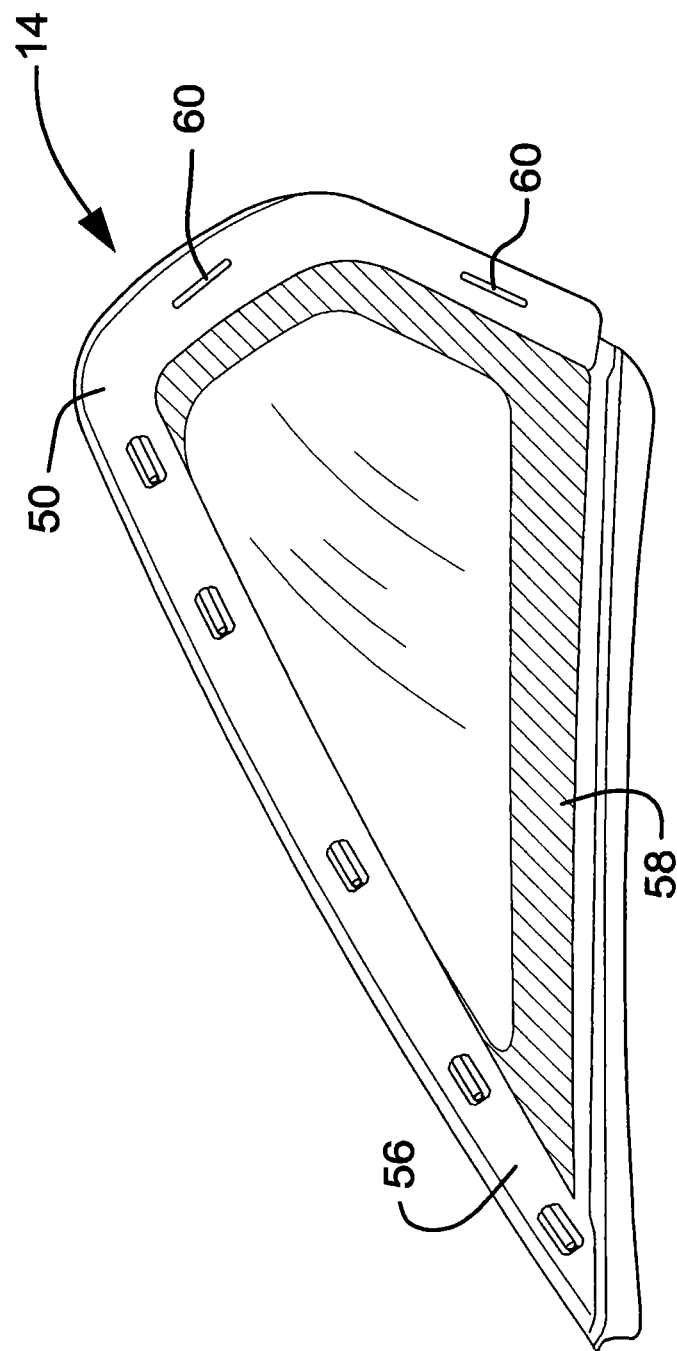
FIG. 5 shows a plan view of the outer surface of the encapsulated vehicle window assembly prior to incorporation of the decorative trim piece.
Figure 6:
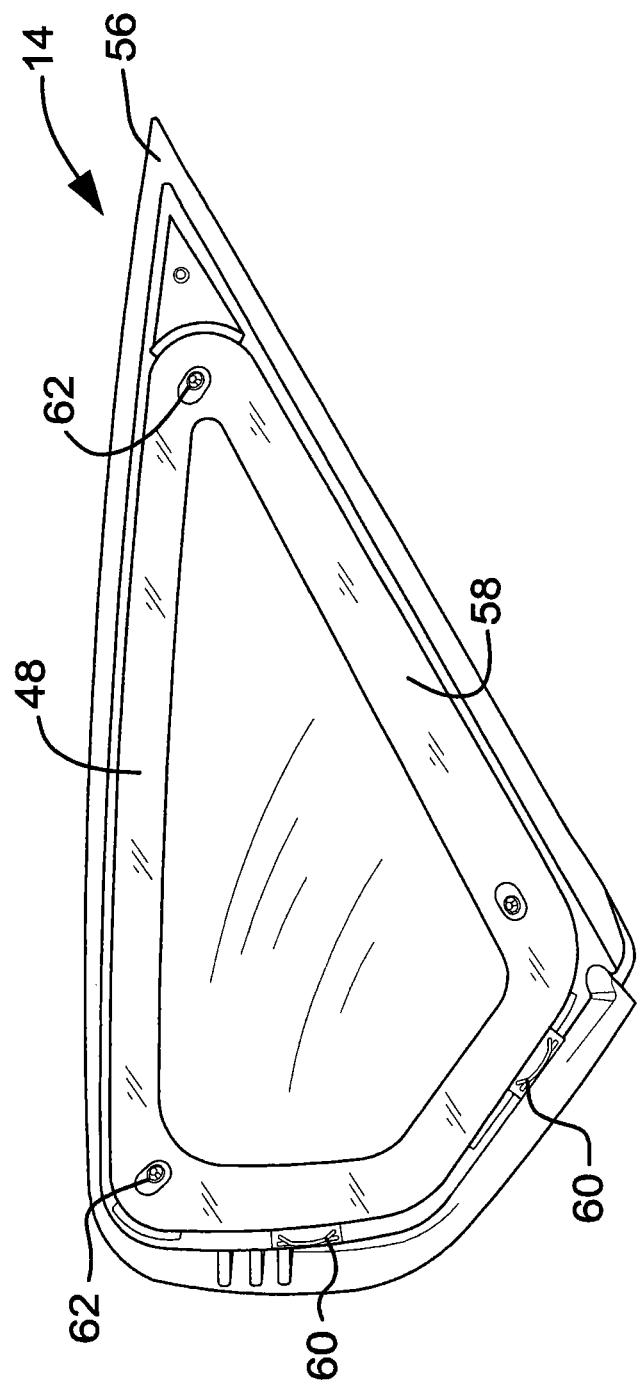
FIG. 6 shows a plan view of the inner surface of the encapsulated vehicle window assembly prior to incorporation of the decorative trim piece.
Figure 7:
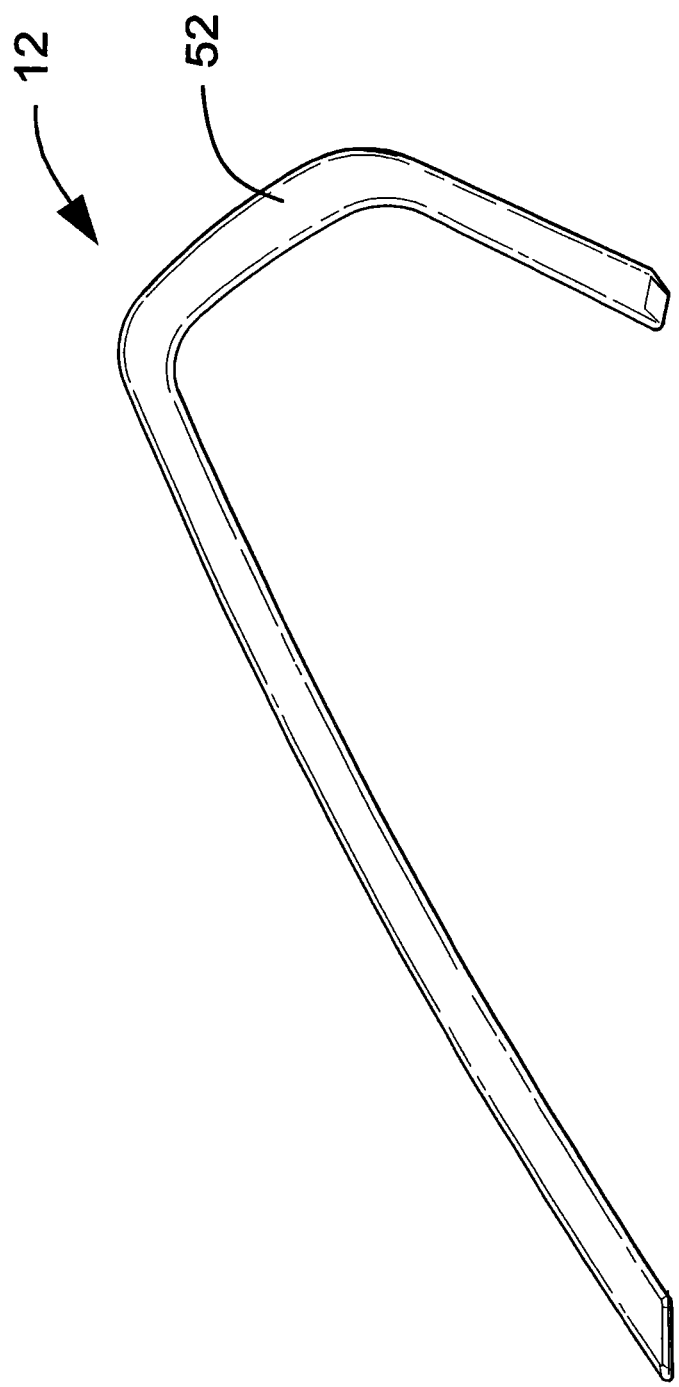
FIG. 7 shows a perspective view of the outer "show" surface of an exemplary decorative trim piece.
Figure 8:
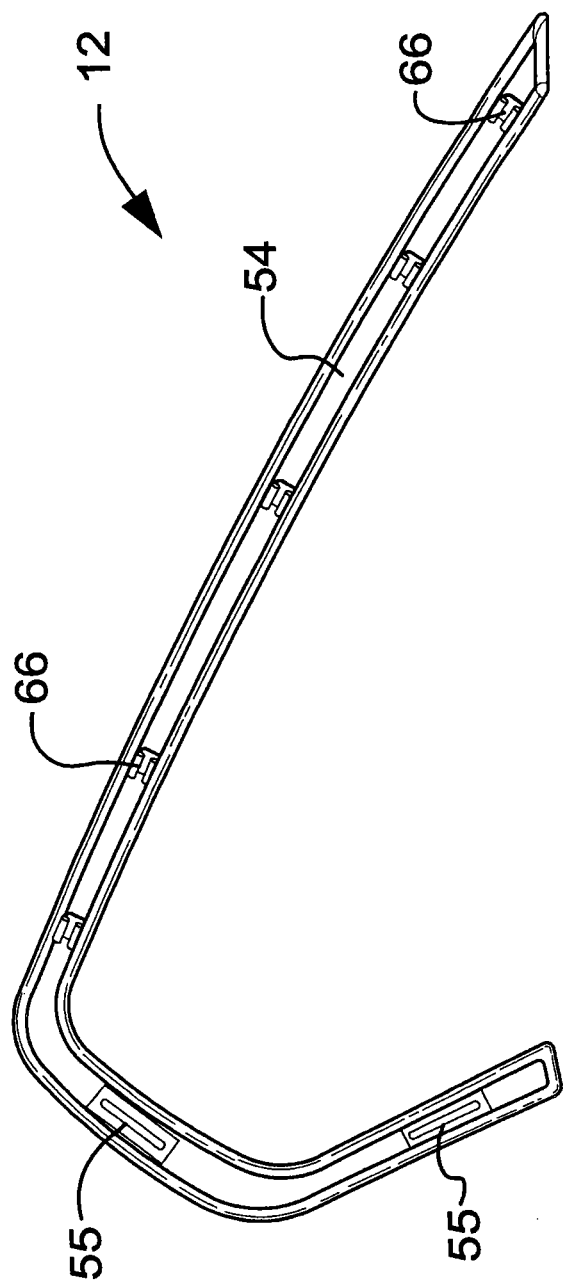
FIG. 8 shows a perspective view of the inner engaging surface of an exemplary decorative trim piece.

Onto the assembly fixture 10, in supported contact with the at least one positioning block 20 and the at least one resilient vertical support member 22 at a predetermined distance above the base member 16, is placed an encapsulated window assembly 14 having:

- an inner surface 48 and an outer surface 50; (see FIGS. 6 and 5)
- the outer surface 50 being capable of receiving a decorative trim piece 12;
- the decorative trim piece 12 having an outer show surface 52 and an inner engaging surface 54 having one or more attachment tabs 55 extending therefrom (see FIGS. 7 and 8);
- an elastomeric member 56 bonded to at least a portion of a peripheral region 58 of one or more of the inner 48 and outer 50 surface of the vehicle window portion of the vehicle window assembly 14;
- the elastomeric member 56 having trim piece tab receiving slots 60 formed therein (see FIGS. 5 and 6);
- at least one vehicle body positioning pin 62 molded onto the inner surface 48 of the vehicle window portion of the vehicle window assembly 14, inboard of the elastomeric member 56 (see FIG. 6).

Figure 9:
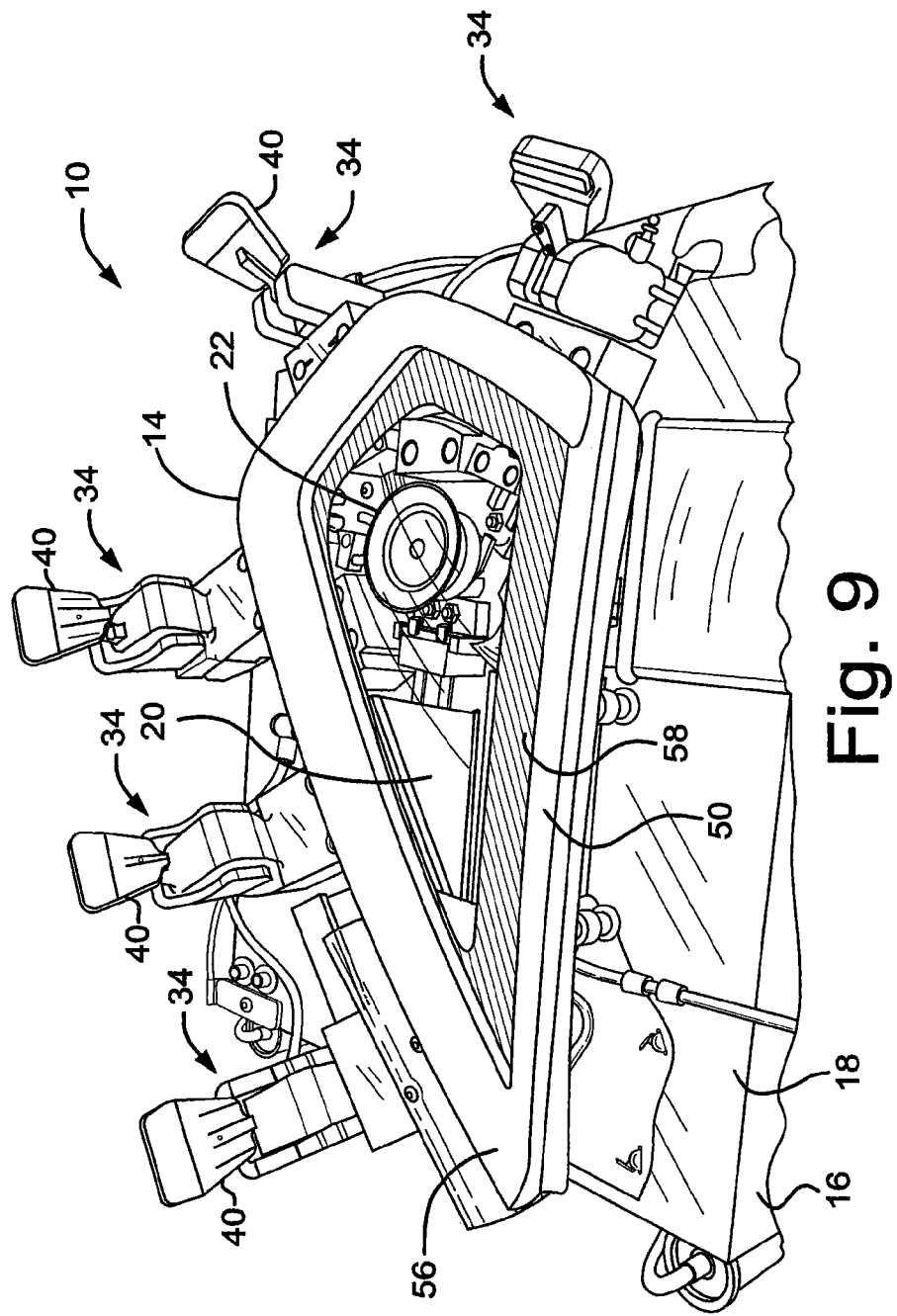
FIG. 9 shows the encapsulated window assembly placed on the assembly fixture ready for incorporation of a decorative trim piece according to the invention.

With the vehicle window assembly 14 just described positioned on the at least one positioning block 20 and the at least one resilient vertical support member 22, certain portions of the encapsulated vehicle window assembly 14 are thereby positioned relative to the above-described operational components of the assembly fixture 10 (see FIG. 9) as follows:

- at least a portion of the inner surface 48 of the encapsulated window assembly 14 is proximate the movable jaw(s) 28 of the at least one trim piece tab crimping vice 26;
- at least one area inboard of the elastomeric member 56 on the inner surface 48 of the window assembly 14, and proximate the at least one molded-on vehicle body positioning pin 62 is proximate the one or more trimming blades 32 of the at least one encapsulation trimming device 30;
- at least a portion of the periphery 58 of the outer surface 50 of the encapsulated window assembly 14 capable of receiving the decorative trim piece 12 is proximate the movable setting paddle 40 of the at least one trim piece setting device 34.

With the encapsulated vehicle window assembly 14 properly positioned on the assembly fixture 10, the negative gaseous pressure source is actuated through the at least one resilient vertical support member 22 so as to cause the encapsulated vehicle window assembly 14 to be drawn by the vacuum to adhere to at least the resilient vertical support member 22, thus maintaining the vehicle window assembly 14 in the desired position on the fixture 10 during the application of the decorative trim piece 12.

The inner engaging surface 54 of the decorative trim piece 12 is then placed in pre-attachment contact with the outer surface of the elastomeric member 56 so that the trim piece attachment tabs 55 are aligned with the trim piece attachment tab receiving slots 60 in the elastomeric member 56 of the encapsulated vehicle window assembly 14.

The movable setting paddle 40 of the at least one trim piece setting device 34 is then actuated, causing the movable setting paddle 40 to pressingly engage a predetermined portion of the outer surface 52 of the decorative trim piece 12. Such pressing engagement causes the trim piece attachment tabs 55 to extend through the trim piece attachment tab receiving slot(s) 60 and the inner engaging surface 54 of the decorative trim piece 12 to come into seating contact with a predetermined portion of the outer surface 50 of the elastomeric member 56 of the window assembly.

Depending on the specific part which is being assembled, it may be desirable to actuate the at least one trim piece tab crimping vice 26 and the at least one encapsulation material trimming device 30 either simultaneously or, in the alternative, sequentially. Whichever mode of operation is chosen, the actuation of the trim piece tab crimping vice 26 causes the jaws 28 thereof to crimpingly close about the distal end of the trim piece attachment tab 55 extending through the at least one trim piece attachment tab receiving slot 60, so as to lockingly secure the trim piece attachment tab 55 in the trim piece attachment receiving slot 60. Likewise, whichever mode of operation, simultaneous or sequential, is used, actuation of the at least one encapsulation trimming device 30 causes the at least one trimming blade 32 of the encapsulation material trimming device 30 to scrapingly remove undesired encapsulation material from at least one area inboard of the elastomeric member 56 on the inner surface 48 of the window assembly proximate the at least one molded-on vehicle body opening positioning pin 62. At this point in the assembly process, the decorative trim piece 12 is substantially incorporated into the encapsulated vehicle window assembly 14.

The negative gaseous pressure previously applied to hold the encapsulated vehicle window assembly 14 in place on the fixture 10 can now be discontinued. The encapsulated vehicle window assembly 14 with attached/incorporated decorative trim piece 12 may now be removed from the assembly fixture 10.

The encapsulated vehicle window assembly 14 with decorative trim piece 12 may then, for example, be directly installed to close an opening in a vehicle body, may be stored, or may be shipped to a remote vehicle manufacturing facility for installation in a vehicle body opening.

Figure 10:
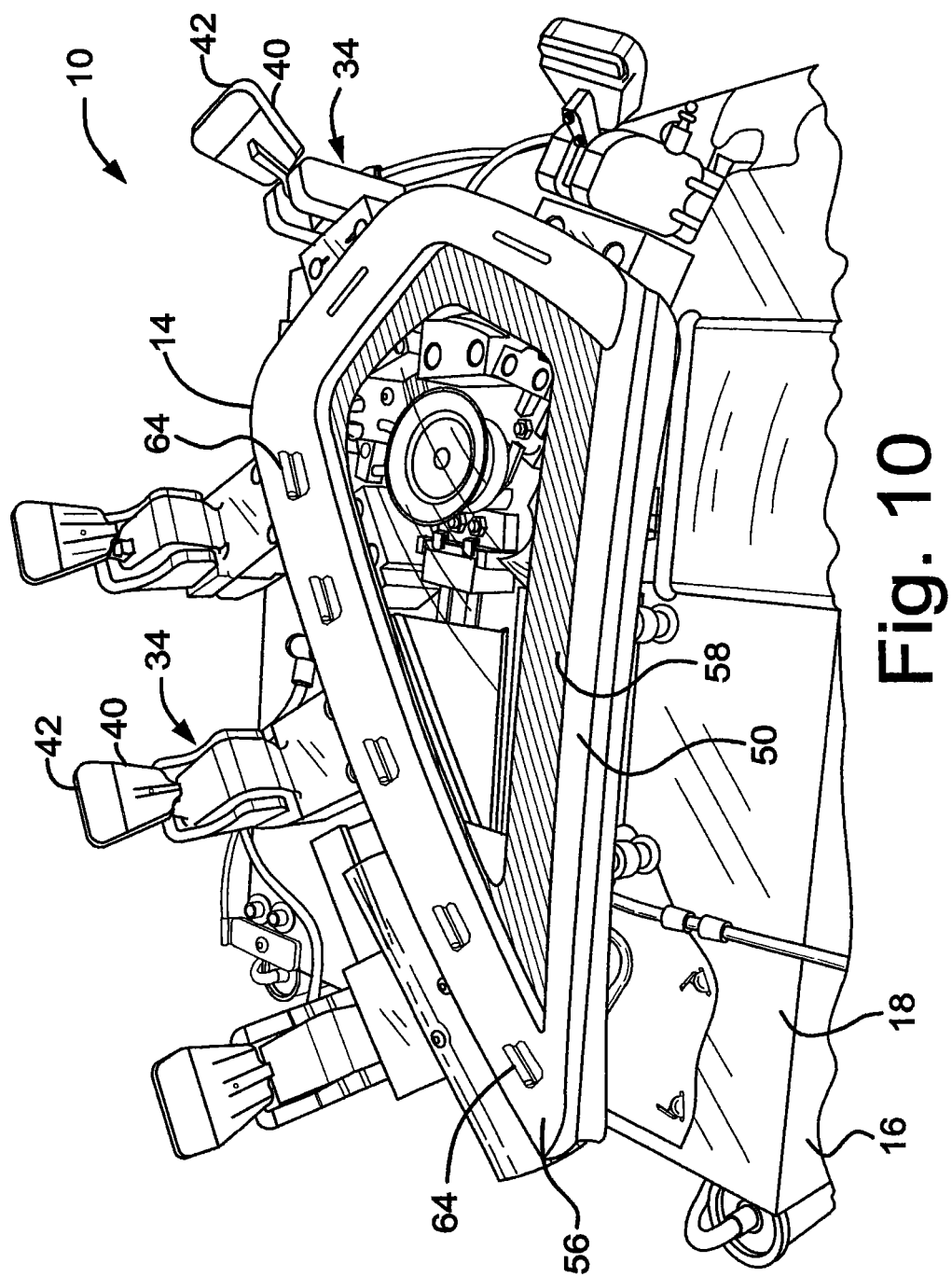
FIG. 10 shows a perspective view of an encapsulated window assembly having an optional male snap-on block feature, placed on the assembly fixture for incorporation of a decorative trim piece according to the invention.
Figure 11:
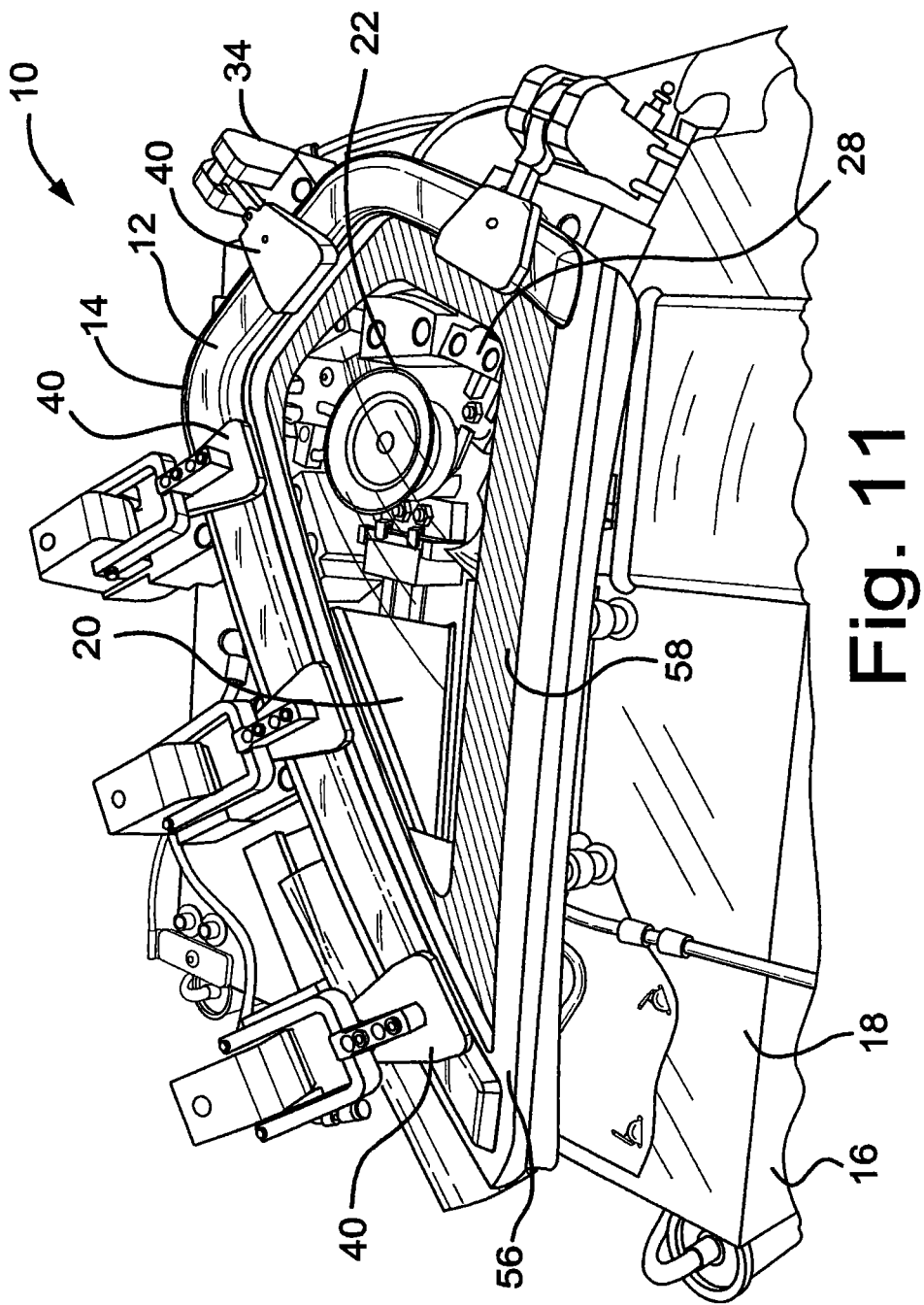
FIG. 11 shows a perspective view of the decorative trim piece being affixed to the encapsulated vehicle window assembly by operation of the assembly fixture according to the invention.

It may be desirable to even more positively attach the decorative trim piece 12 to the elastomeric member portion 56 of the encapsulated vehicle window assembly 14. For example, as shown in FIG. 10, at least one male snap-on block 64 having any desired geometric shape is disposed in a predetermined location on the outer surface 50 of the elastomeric member 56, and at least one flexible female snap-on block receiving feature 66 is disposed on the inner engaging surface 54 of the decorative trim piece 12 so as to be engageable with the at least one male snap-on block 64. When the movable setting paddle 40 of the at least one trim piece setting device 34 is actuated, the at least one flexible female snap-on block receiving feature 66 lockingly engages with the at least one male snap-on block 64, thus creating additional points of engagement between the decorative trim piece 12 and the elastomeric member 56 of the encapsulated vehicle window assembly 14.

In some instances, to minimize the possibility of the trim piece attachment tab 55 of the decorative trim piece 12 being dislodged from the elastomeric member of the encapsulated vehicle window assembly, a reinforcing member may be molded into the elastomeric member 56 in a position such that the trim piece attachment tab(s) 55 will be pressed through openings in the reinforcing member and lockingly secured therethrough, as has previously been described herein. In this configuration, the decorative trim piece 12 is even more positively attached to the encapsulated vehicle window assembly 14.

The assembly fixture 10 of the invention could also be utilized to pressingly adhesively bond a decorative trim piece 12 onto the encapsulated vehicle window assembly 14, where a suitable adhesive, in whatever form, is disposed, for example, on the engaging surface 54 of the decorative trim piece 12, or on the outer surface 50 of the elastomeric member 56.

It is also within the scope of the invention that magnetic means may be employed to maintain or assist in maintaining the encapsulated vehicle window assembly 14 in a desired pre-assembly position on the assembly fixture 10.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A fixture for assembling an encapsulated vehicle window assembly having an outer surface, an inner surface, and an elastomeric member bonded to at least a portion of a peripheral region between the outer surface and the inner surface, the encapsulated vehicle window assembly being capable of receiving a decorative trim piece, the fixture comprising:
   a base member;
   at least one positioning block affixed relative to the base member;
   at least one resilient vertical support member affixed relative to the base member and connected to a source of negative gaseous pressure, the encapsulated vehicle window assembly being positioned on the at least one positioning block and the at least one resilient vertical support member; and
   at least one trim piece setting device affixed relative to the base member and operably positioned proximate the peripheral region of the encapsulated window assembly, the at least one trim piece setting device having a movable setting paddle pressingly engageable with the decorative trim piece.

2. The fixture defined in claim 1, wherein components of the fixture are actuated by a system chosen from the group consisting of: electrical, hydraulic, pneumatic, and combinations thereof.

3. The fixture defined in claim 1, wherein the fixture comprises at least one control device.

4. A fixture for assembling an encapsulated vehicle window assembly including a decorative trim piece comprising
   a base member;
   affixed to the base member, in predetermined positions thereon, relative to an encapsulated window assembly capable of receiving a decorative trim piece and having an outer surface, an inner surface, and an elastomeric member bonded to at least a portion of a peripheral region between the outer surface and the inner surface, are:

at least one positioning block;

at least one resilient vertical support member connected to a source of negative gaseous pressure, wherein the encapsulated vehicle window assembly is positioned/supported on the at least one positioning block and the at least one resilient vertical support member;

at least one trim piece tab crimping vice, having a pair of jaws, at least one of which is movable, and operably positioned proximate the periphery of the inner surface of the encapsulated window assembly;

at least one encapsulation material trimming device having one or more trimming blades, and operably positioned inboard of the elastomeric member proximate the inner surface of the encapsulated window assembly; and at least one trim piece setting device operably positioned proximate the peripheral region of the encapsulated window assembly having a movable setting paddle pressingly engageable with the decorative trim piece.

5. The fixture defined in claim 4, wherein at least one air cleaning device is located proximate the at least one encapsulation material trimming device.

6. The fixture defined in claim 5, wherein a protective covering substantially surrounds the encapsulation material trimming device, but allows the at least one trimming blade to protrude through the protective covering.

7. The fixture defined in claim 1, further comprising at least one trim piece tab crimping vice, having a pair of jaws, at least one of which is movable, and operably positioned proximate the periphery of the inner surface of the encapsulated window assembly.

* * * * *